United States Patent
Morrison et al.

[15] 3,694,516
[45] Sept. 26, 1972

[54] PREPARATION OF HYDROCARBON SOLVENT SOLUTIONS OF ORGANOLITHIUM COMPOUNDS

[72] Inventors: Robert C. Morrison, Conrad W. Kamienski, both of Gastonia, N.C. 28052

[73] Assignee: Lithium Corporation of America, New York, N.Y.

[22] Filed: Oct. 5, 1970

[21] Appl. No.: 78,203

[52] U.S. Cl. ......... 260/665 R, 252/431 R, 260/83.7, 260/84.1, 260/94.2 M
[51] Int. Cl. ........................... C07f 1/02, C08d 3/04
[58] Field of Search..260/665 R, 94.2 M; 252/431 R, 252/431 N

[56] References Cited

UNITED STATES PATENTS

| | | |
|---|---|---|
| 3,301,840 | 1/1967 | Zelinski.............260/94.2 M |
| 3,377,404 | 4/1968 | Zelinski.............260/665 R |
| 3,388,178 | 6/1968 | Kamienski..........260/665 R |
| 3,541,149 | 11/1970 | Langer.............260/665 R |

Primary Examiner—Tobias E. Levow
Assistant Examiner—A. P. Demers
Attorney—Wallenstein, Spangenberg, Hattis & Strampel

[57] ABSTRACT

Method of preparing hydrocarbon solvent solutions of organolithium compounds in which solutions such as benzene or heptane solutions of di- and poly-lithio adducts of polyisoprenes or polybutadienes containing strongly solvating ethers such as dimethyl ether or tetrahydrofuran are treated with weakly solvating ethers such as anisole, or weakly solvating tertiary amines such as triethylamine, to effect displacement from said solutions of the dimethyl ether or tetrahydrofuran. The resulting solutions are useful as catalysts in the production of conjugated polyene hydrocarbon polymers or copolymers thereof with vinyl-substituted aromatic hydrocarbons, having high cis-1,4 contents, as well as vinyl-substituted aromatic hydrocarbon polymers.

25 Claims, No Drawings

PREPARATION OF HYDROCARBON SOLVENT SOLUTIONS OF ORGANOLITHIUM COMPOUNDS

It is known to the art that the presence of appreciable quantities of certain ethers, such as dimethyl ether, diethyl ether and tetrahydrofuran, in hydrocarbon solvent solutions of organolithium compounds such as n-butyllithium or sec-butyllithium changes the manner in which these compounds affect the stereoregular polymerization of conjugated dienes [c.f. A.V. Tobolsky and D.E. Rogers J. Polymer Science, 40, 73 (1959)]. Thus, for instance, in the polymerization of isoprene using alkyllithium catalysts, it is impossible to obtain any or any appreciable cis 1,4-microstructure in the resultant polymer when appreciable quantities of such ethers as diethyl ether or tetrahydrofuran are present. It was heretofore found, however, that, in the presence of weakly complexing ethers such as anisole or phenyl ether, high percentages of cis-1,4 microstructure could be obtained, comparable to that obtained in hydrocarbon solvents alone. Thus, for example, 82 percent cis-1,4 polyisoprene microstructure was obtained using phenyl ether as the solvent for polymerization. It has also heretofore been shown that a polyisoprene prepared using 1,4-dilithio-1,1,4,4-tetraphenylbutane in a cyclohexane-anisole medium possessed a microstructure having the composition: 65-70 percent cis-1,4; 20-25 percent trans-1,4; and the remainder 3,4. [c.f. L.J. Fetters and M. Morton, Macromolecules 2, 453 (1969)]. A high cis-1,4 microstructure is necessary to obtain elastomeric properties in the resultant polydiene.

There is considerable literature extant describing the preparation of solutions of organodilithium compounds from lithium metal (c.f. for example, U.S. Pats. No. 3,091,606; 3,278,617; 3,193,590; and 3,388,178). In all the cases cited, the ethers utilized are required in at least stoichiometric quantities equivalent to the lithium metal in order to obtain reasonable yields of organodilithiums and to keep the resultant product in solution.

In U.S. Pat. No. 3,377,404, a modified procedure is shown in which ether-free hydrocarbon-soluble di- and poly-lithioorganics are described. Even here, however, a solution of the dilithioorganic is initially prepared in a dialkyl ether such as diethyl ether or a cyclic ether such as tetrahydrofuran. To this solution is then added sufficient conjugated diene to cause solubilization of the resulting "chain-extended" di- or poly-lithioorganic in a hydrocarbon medium when the ether is removed. The ether solution is then distilled under vacuum to remove most of the solvent, and a hydrocarbon diluent added to the residue to effect solubilization. Most of the residual ether is then removed by a series of vacuum distillations and redilutions with a hydrocarbon solvent. The difficulty in removing the residual ether is inherent in the nature of the strong complexation thereof with organolithium compounds. For example, in U.S. Pat. No. 3,388,178, there is described a process for producing a hydrocarbon (benzene) solution of a lithium-conjugated polyene (isoprene) adduct solvated with two equivalents of dimethyl ether. Much of the dimethyl ether, which acts as a solvent, can be readily removed at atmospheric pressure by slight warming of the solution and replacement of solvent with benzene (to 30° C). However, an amount of the ether, corresponding to one mole per equivalent of lithium in the benzene solution, cannot be removed in this manner and only a series of continuous vacuum distillations and redilutions with benzene will eventually yield an essentially ether-free product. This product has the additional unfortunate attribute, however, of being insoluble in the benzene solvent. Only chain-extension of the original benzene solution, containing an equivalent of dimethyl ether, per C-Li, with isoprene eventually allows for the preparation of a soluble dilithioorganic. Although the resultant product is almost completely soluble in benzene, it is also quite viscous and contains some undissolved product. These attributes are deleterious to its most efficient use as a catalyst in the homogeneous anionic polymerization of conjugated dienes and of vinyl-substituted aromatic hydrocarbons.

It has now, unexpectedly, been found that certain ethers and tertiary amines, such as anisole, dimethylaniline and triethylamine, act as solvents or cosolvents for both the lithium-isoprene or other lithium conjugated polyene adducts and their chain-extended counterparts. Further, these ethers act as excellent displacing agents for the complexed portion of dimethyl ether in the lithiumisoprene adduct solutions in benzene described above and in U.S. Pat. No. 3,388,178. This allows the displaced dimethyl ether in these solutions to be easily stripped out in a single distillation at low temperatures, thus avoiding known thermal decomposition reactions. The resulting product is completely soluble even when it is diluted with major quantities of a hydrocarbon solvent such as benzene. The chain-extended counterpart can then be produced directly by addition of a conjugated 1,3-diene to this solution. Alternatively, the original lithium-isoprene adduct solution containing solvated dimethyl ether may be chain-extended with more isoprene. Then, after addition of anisol or similarly acting cosolvents, the solution may be stripped under vacuum to remove the complexed or solvated dimethyl ether. The resulting or remaining product is a clear, fluid solution of the chain-extended dilithio isoprene adduct in benzene-anisole. Such chain extensions are desirably of slight character. Thus, while the amount of the additional conjugated polyene hydrocarbon or vinyl-substituted hydrocarbon is somewhat variable to achieve the slight chain extension here contemplated in the solutions made pursuant to the present invention, it will usually be in the range of somewhat more than 1 up to about 3 moles per C-Li bond.

Mono-, di- and poly-lithioorganics are amenable to this treatment. However, monolithioorganics such as n-butyl- and sec-butyllithium are generally soluble in hydrocarbon solvents in the absence of dialkyl ethers or tertiary amines and, hence, do not require the described displacement technique.

On the other hand, di- and poly-lithioorganics are not generally soluble in hydrocarbon solvents in the absence of ethers or tertiary amines such as dimethyl ether, diethyl ether, tetrahydrofuran, trimethylamine and methyltriethylenediamine, and, therefore, the invention of the present application is directed particularly to the treatment of solutions of di- and poly-lithioorganics in mixtures of hydrocarbon solvents and such ethers which are of strongly solvating power. Dilithioorganics which can be readily solubilized by the process of this invention are, for example, those which result through the dimerization of various conjugated dienes or vinylaromatic compounds with lithium metal, exemplified by 1,3-dilithio-2,7-dimethylocta-2,6-diene; 2,4-dilithio, 2,4-diphenyl-hexane; 1,4-dilithio-1,1,4,4-tetraphenylbutane and 1,8-dilithio-2,3,6,7-tetramethyl-octa-2,6-diene. Other types of dilithioorganics, may also be solubilized as, for example, those derived by lithiumhalogen exchange reactions. In this category are alkylene dilithiums such as, for example, 1,4-dilithiobutane; 1,5-dilithiopentane; 4,4-dilithiobiphenyl and 2,2-dilithiodiphenyloxide. Polylithioorganics, wherein there are 3 or 4 lithiums in the molecule are shown, for instance, in U.S. Pat. No. 3,377,404 the disclosure of which with respect thereto is herewith incorporated by reference. As shown in said U.S. Pat. No. 3,377,404, the polylithioorganics can be identified by the formula $RLi_x$ where $x$ is an integer from 2 to 4, and R is a hydrocarbon radical selected from the group consisting of aliphatic, cycloaliphatic and aromatic radicals.

The ethers which are useful in the practice of the present invention, and which serve to displace such ethers as dimethyl ether, diethyl ether and tetrahydrofuran, are liquids having weak-solvating properties and are generally alkyl aryl ethers, being exemplified by anisole, ethyl phenyl ether, isopropyl phenyl ether, ethyl naphthyl ether, n-butyl naphthyl ether, dibenzyl ether, n-butyl phenyl ether, ethyl tolyl ether, isopropyl tolyl ether and, in general, $C_1$—$C_8$ alkyl-aryl ethers; and diaryl ethers such as diphenyl ether, dinaphthyl ether, di-p-tolyl ether and phenyl o-tolyl ether. The foregoing weakly solvating ethers are sharply distinguishable from the strongly solvating ethers such as dimethyl ether, diethyl ether, diamyl ether or other $C_2$—$C_8$ or $C_2$—$C_{12}$ dialkyl ethers, or cyclo ethers such as tetrahydrofuran and tetrahydropyran.

The tertiary amines which are useful in the practice of the present invention and which can be used to displace such ethers as dimethyl ether, diethyl ether and tetrahydorfuran, are liquids having weak-solvating properties and are generally low molecular weight trialkylamines which do not contain any methyl groups, illustrative examples of which are triethylamine, tri-n-propylamine, tri-isopropylamine, ethyl di-n-butylamine and triisobutylamine and other $C_2$—$C_8$ alkyl tertiary amines. Aralkylamines can also be used, illustrative examples of which are dimethylaniline, diethylaniline, diisopropylaniline and methylisobutylaniline. Again, the foregoing weakly solvating aliphatic tertiary amines are sharply distinguishable from the strongly solvating aliphatic tertiary amines such as trimethylamine, N,N,N',N'-tetramethylethylenediamine and methyltriethylenediamine.

The term "weakly solvating," as applied to the ethers and tertiary amines, is intended to mean those compounds of said chemical classes whose effect on the microstructure of polymers of conjugated dienes, notably isoprene and 1,3-butyadiene, is substantially the same or little different from that exerted by pure liquid hydrocarbon solvents such as benzene, toluene, n-heptane, n-hexane and the like. Contrariwise, "-strongly solvating," as applied to ethers and tertiary amines, is intended to mean those compounds whose effect on the microstructure of conjugated dienes, notably isoprene and 1,3-butadiene, is to produce little (generally less than 10 percent) or no cis-1,4 microstructure in the resulting polymer, which is very substantially different from what is obtained in the presence of pure liquid hydrocarbons such as those mentioned above.

A variety of combinations is possible of the aforesaid weakly solvating ethers or tertiary amines and liquid hydrocarbon solvents in the practice of the method of the present invention. The liquid hydrocarbon solvents can be of aliphatic, cycloaliphatic, aromatic or aromatic-aliphatic character and are particularly exemplified by n-heptane, n-hexane, n-octane, isooctane, cyclopentane, cyclohexane, cyclooctane, benzene, toluene, ethyl benzene, propyl benzene, isopropyl benzene, and compatible mixtures of any two or more thereof. The weight ratios of said weakly solvating ethers or tertiary amines to said liquid hydrocarbon solvents are variable within quite large ranges, and usually will fall within the range of from 5 to 95 percent of said weakly solvating ethers or tertiary amines to 95 to 5 percent of said liquid hydrocarbon solvents. In general, however, it is desirable to keep the weakly solvating ethers or tertiary amines to a minimum since excessive amounts thereof tend to exert a weak influence on the microstructure of derivative polydienes, causing a decrease in the cis-1,4 content. A more desirable range is from 5 to 50 percent of the weakly solvating ether or aliphatic tertiary amine to from 95 to 50 percent of the liquid hydrocarbon solvent, and especially advantageous is a range of 5 to 20 percent of said ether or amine to 95 to 80 percent of said solvent, said percentages being by weight in relation to each other.

The following examples are further illustrative of the practice of the invention, but they are not to be construed as in any way limitative thereof since various changes can readily be made and various other compositions prepared in the light of the guiding principles and teachings disclosed herein. All temperatures recited are in degrees Centigrade.

In Examples 1 dimethyl and 2, comparisons are made among dimethyl ether-solvated dilithioorganics, unsolvated dilithioorganics, and organics solvated with weakly solvated compounds in accordance wit the present invention.

EXAMPLE 1 a. Preparation of a diemt-yl ether-solvated dilithioorganic 28.5g of lithium metal, as a 30 wt percent dispersion in mineral oil and having an average particle size of about 20 microns in diameter, was charged to an argon-swept reaction flask fitted with a mechanical stirrer, thermometer, addition funnel and reflux condenser. The flask was cooled to −25°. Then, 304 g of benzene was added to the dispersion and 755 g of dimethyl ether was condensed into the foregoing mixture. The addition funnel was filled with 255 g of isoprene. The temperature was maintained at −25° and stirring was begun. A benzene solution (0.8 N concentration) of a preformed dilithiopolyisoprene adduct was added. Then 5 g of isoprene was rapidly added to the reaction mixture in the flask. The reaction initiated immediately as indicated by a temperature rise and the formation of a green color. The isoprene was slowly added during a 1-hour period. When the reaction was complete, the excess dimethyl ether was removed and additional benzene was added to obtain a product 1.0 N in dilithiopolyisoprene adduct, The product solution, containing a dilithiopolyisoprene adduct, was filtered to remove the unreacted lithium metal. The solution contained about 6 wt percent dimethyl ether.

b. Preparation of an unsolvated dilithioorganic from product (a)

Approximately 1,000 ml of the product obtained in part a. of Example 1 was evaporated to dryness in a vacuo. To the dried product 100 ml of n-heptane was added and the mixture stirred until the cake was broken up into small particles. The mixture was evaporated to dryness and the same process repeated twice, using benzene instead of n-heptane. A vacuum of a fraction of a millimeter was applied for several hours at 40°–50°. Then, n-pentane was added and the mixture stirred while the solvent was slowly distilled. After 100 ml of distillate had been collected, a sample of the residual slurry was hydrolyzed and assayed for dimethyl ether content by vapor phase chromatography. The dimethyl ether content was found to be under 0.25 wt percent. The product slurry was filtered and the solid dried to a powder by passage through it of a stream of dry argon. The product (24 g) was a fine orange powder which smoked and burned in air.

c. Preparation of an anisole solvated dilithioorganic from product (a)

400 ml of the product obtained in part a. of this example and 200 ml of anisole were mixed in a 2-liter, 3-necked flask. After standing for about 12 hours, the flask and contents were attached to a laboratory, rotating, flash-evaporator and about 300 ml of solvents removed over a 3-hour period at a temperature of 0° to 10° and a vacuum of 12 mm. Analysis of the distillate showed that very little anisole had been lost from the product solution. The residual solution was clear and orange-red in color and was diluted with 100 ml of dry benzene. Analysis of the solution showed the total lithium content to be 1.29 N and the active carbon-lithium content to be 1.24 N. Gas-liquid chromatographic analysis showed that the dimethyl ether content had been reduced to a level of 1 equivalent per 166 equivalents of carbon-lithium bonds present.

It will thus be seen that the weakly solvating anisole has a boiling point (154° C) which is substantially higher than the boiling point of the strongly solvating dimethyl ether (−25° C), and thus, on said evaporation, substantially all of the strongly solvating dimethyl ether is stripped out without substantial evaporation of the weakly solvating anisole.

EXAMPLE 2 a. Preparation of a dimethyl ether-solvated adduct of lithium metal and 2,3-dimethylbutadiene 14 g of a 30 wt percent lithium dispersion in mineral oil (0.6 g atoms Li containing 1 wt percent of Na) was reacted with 50 g (0.6 moles) of 2,3-dimethyl-1,3-butadiene in 500 ml of dimethyl ether at −31°. A volume of 250 ml of dry benzene was added and the mixture allowed to warm to room temperature. An additional 300 ml of benzene was then added. After filtration to remove unreacted lithium metal, a clear, fluid, bright cherry-red 1.16 N solution of the dilithio-adduct of said dimethyl-butadiene in benzene-dimethyl ether was obtained. The yield of adduct based on lithium metal was 80 percent.

b. Preparation of an Unsolvated Adduct of Lithium Metal and 2,3-dimethylbutadiene Benzene and dimethyl ether solvents were removed from a 100 ml portion of the 2a product by flash distillation. The dimethyl ether-free product was a yellow, crystalline material which was only slightly soluble in benzene (ca. 0.1 N).

c. Preparation of a N,N-dimethylanilinesolvated Adduct of Lithium Metal and 2,3-dimethyl Butadiene 350 ml of the product obtained in part a of this example and 150 ml of N,N-dimethylaniline were mixed together and treated as described in Example 1. After removal of most of the benzene and all of the dimethyl ether under vacuum, the residue was diluted with 150 ml of dry benzene to yield a clear, red 1 N solution of the dilithio adduct of 2,3-dimethylbutadiene dimer in benzene-dimethylaniline. The dimethyl ether content of this solution was determined to be less than 1 equivalent per 100 equivalents of carbon-lithium.

EXAMPLE 3

In this Example, a comparison is made between a dilithioorganic in a trimethylamine-solvated system, in a pure hydrocarbon medium, and in weakly solvated tertiary amine (N,N-dimethyl aniline) system.

a. Preparation of a Trimethylaminesolvated Dilithioorganic 5.33 g of a lithium dispersion, 30 wt percent in mineral oil [1.6 g (0.23 g atoms) of lithium containing 0.5 wt percent sodium], and 5 ml of n-heptane were placed in a 300 ml, three-necked round-bottom flask equipped with mechanical stirrer, dry-ice condenser with gas inlet tube for argon, 100 ml graduated dropping funnel, and gas-inlet tube for solvent. 1 ml of a 1 N solution of the dilithio adduct of isoprene in benzene was added and the mixture stirred for 15 minutes. 100 milliliters of trimethylamine (dried by passing through anhydrous $CaSO_4$) was condensed into the flask. 2 ml of isoprene, previously dried over powdered molecular sieves, was added to the stirred mixture at reflux (10°). The color of the mixture turned from silvery-grey to orange within a few minutes and the reflux rate increased. The remainder of the 25 ml (0.25 moles) of isoprene was added to the rapidly stirred mixture at reflux over a period of 45 minutes. Toward the end of the addition, the mixture slowly turned from a deep orange-red to a light green color. Stirring was continued for 0.5 hour after addition was complete. The solvent was allowed to boil off with the aid of a warm water bath and the temperature gradually rose to 24° over a period of 1 hour. 80 ml of benzene, previously dried over molecular sieves, was added to the thick, stirred residue. Very little metal was left at this point, although some other solids were also present. The clear, light yellow-orange solution, which was filtered away from these solids, had a volume of 125 ml and a total concentration of 1.42 N. The yield of dilithio adducts of isoprene was 77 percent based on initial lithium metal. Analysis of a sample of hydrolyzed solution by GLC showed that the dimer content ($C_{10}H_{18}$) represented 90 percent of the total oligomers formed, the remainder being mainly trimer ($C_{15}HH_{26}$).

b. Preparation of a N,N-dimethylaniline-solvated Dilithioorganic from a Trimethylamine-solvated Dilithioorganic 100 ml of the product solution of the dilithio adduct of isoprene in benzene-trimethylamine prepared in Example 3(a) above was mixed with 50 ml of dry N,N-dimethylaniline. After standing overnight, the product solution was stripped of benzene and trimethylamine under vacuum on a rotating flash evaporator at ambient temperature. Analysis of the distillate showed very little loss of dimethylaniline. The residual product solution was diluted with 50 ml of dry benzene. Analysis of the fluid, clear, orange-red solution showed the total lithium content to be 1.3 N and the trimethylamine content to be less than 1 equivalent per 100 equivalents of carbon-lithium bonds.

EXAMPLE 4

In this Example, a comparison is made between a chain-extended dilithioorganic in dimethyl ether, in a pure hydrocarbon medium, and in anisole.

a. Preparation of a Dimethyl Ether-solvated, Chain-extended Adduct of Lithium Metal and Isoprene A 5 liter, 3-necked flask was charged with 2 liters of a 1 N solution of the adduct of lithium metal and isoprene prepared as described in Example 1(a). 272 g of freshly distilled isoprene was slowly added to the solution at a rate of about 1 ml per minute with stirring. The temperature of the reaction mixture was maintained at 30° throughout the 6.5 hour addition period. A clear, light orange-red, fluid solution resulted.

b. Preparation of an Unsolvated, Chain-extended Adduct of Lithium Metal and Isoprene in Benzene The reaction flask and contents of the product solution of part (a) of this Example were then attached to a heavy duty, rotating flash evaporator and the solvents removed under vacuum over an 8-hour period. 1.5 liters of dry benzene was added to the residual solid mass of product and the mixture stirred overnight to obtain a homogeneous, viscous, fine suspension of the product in benzene. Four such solvent strips and redilutions were required to lower the dimethyl ether content to 1 equivalent per 20 equivalents of carbon-lithium. A 1.1 N light orange, viscous homogeneous suspension was obtained which did not settle in 4 days time. High speed centrifugation of the mixture followed by analysis of the clear supernatant solution showed the presence in solution of approximately 75 percent of the total lithium found in the uncentrifuged suspension.

c. Preparation of an Anisole-solvated, Chain-extended Adduct of Lithium Metal and Isoprene in Benzene 250 ml of a 1 N solution of the adduct of lithium metal and isoprene, prepared as described in Example 1(a), was treated with 0.5 mole of isoprene as described in Example 4(a). Then, 1.15 moles of anisole was added to the resulting product solution. After standing overnight, the solution was attached to a rotating flash evaporator and most of the benzene and essentially all of the dimethyl ether removed under vacuum in 2.5 hours at 0° to 10°. 225 ml of benzene was added to the slightly viscous product solution. GLC analysis of the clear, fluid solution showed that the dimethyl ether content had been reduced from an original 1 equivalent per 1.2 carbon-lithiums to 1 equivalent per 72 carbon-lithiums.

d. Preparation of an Anisole-solvated, Chain-extended Adduct of Lithium Metal and Isoprene 3 liters of a solution of the adduct of lithium and isoprene, prepared as described in Example 1(a), was chain-extended with 600 ml of isoprene as described in Example 4(a). 600 ml of anisole was stirred into the product. The product solution as divided into 2 equal parts and each part stripped on the rotating flash evaporator for approximately 4.5 hours. Both residues were recombined and 1.15 liters of dry benzene added, with stirring. The resulting clear, fluid, dark amber solution was found to be 1.18 N in total lithium and 1.11 N in active carbon lithium content. It contained approximately 15 volume percent anisole.

The weakly solvated ether or tertiary amine — hydrocarbon solvent solutions of the di- or polylithioorganics, as indicated above, are highly useful for the production of conjugated polyene, particularly conjugated diene, polymers, and copolymers with vinyl-substituted aromatic hydrocarbons, having high cis-1,4 contents, of the order of 40 percent to 90 percent or more in various cases, depending upon the monomer utilized, and for the production of polymers derived from vinyl-substituted aromatic hydrocarbon monomers. Such monomers are well known to the art, as are the polymers and copolymers thereof, and are shown, for instance, in U. S. Pat. Nos. 3,091,606 and 3,377,404, the disclosures with respect thereto being incorporated herein by reference.

What is claimed is:

1. In a method of preparing a solvated lithium metal adduct of at least one member selected from the group consisting of (a) conjugated polyene hydrocarbon monomers, (b) vinyl-substituted aromatic hydrocarbon monomers, (c) mixtures of (a) and (b), and (d) their slightly chain-extended oligomers, which comprises providing a solution, in an organic solvent which includes at least one member selected from the group consisting of volatile liquid inert strongly solvating dialkyl ethers, cyclic ethers and tertiary amines, of at least one di- or poly-lithio adduct selected from the aforesaid (a), (b), (c) and (d) groups, admixing said solution with at least one member selected from the group consisting of weakly-solvating liquid ethers and weakly solvating liquid tertiary amines, said weakly solvating compounds having a boiling point substantially higher than the boiling point of said strongly solvating compound, and evaporating from said mixture substantially all of said strongly solvating compound without substantial evaporation of said weakly solvating compound.

2. In a method of preparing a solvated lithium metal adduct of at least one member selected from the group consisting of (a) conjugated polyene hydrocarbon monomers, (b) vinyl-substituted aromatic hydrocarbon monomers, (c) mixtures of (a) and (b), and (d) their slightly chain-extended oligomers, which comprises providing a solution, in a mixture of a volatile liquid hydrocarbon solvent with at least one member selected from the group of volatile liquid inert strongly solvating dialkyl ethers, cyclic ethers and tertiary amines, of at least one di- or poly-lithio adduct selected from the aforesaid (a), (b), (c) and (d) groups, admixing said solution with at least one member selected from the group consisting of weakly-solvating liquid ethers and weakly solvating liquid tertiary amines, said weakly solvating compounds having a boiling point substantially higher than the boiling point of said strongly solvating compound, and evaporating from said mixture substantially all of said strongly solvating compound without substantial evaporation of said weakly solvating compound.

3. The method of claim 2, wherein the liquid hydrocarbon solvent has a boiling point such that the evaporation is also effective to remove a substantial part of the liquid hydrocarbon solvent, and then adding a liquid hydrocarbon solvent to produce a solution of said adduct in a mixture containing said weakly solvating compound and liquid hydrocarbon solvent in a weight ratio of 50 to 50 of said weakly solvating compound to 95 to 50 of said liquid hydrocarbon solvent.

4. The method of claim 1, wherein the evaporation is effected by flash evaporation.

5. The method of claim 2, wherein the evaporation is effected by flash evaporation.

6. The method of claim 1, wherein the conjugated polyene hydrocarbon is at least one member selected from the group consisting of isoprene and 1,3-butadiene, and the adduct is a dilithio adduct.

7. The method of claim 2, wherein the conjugated polyene hydrocarbon is at least one member selected from the group consisting of isoprene and 1,3-butadiene, and the adduct is a dilithio adduct.

8. The method of claim 1, wherein the strongly solvating compound is at least one member selected from the group consisting of $C_2$–$C_8$ dialkyl ethers and cyclic ethers.

9. The method of claim 2, wherein the strongly solvating compound is at least one member selected from the group consisting of $C_2$–$C_8$ dialkyl ethers and cyclic ethers.

10. The method of claim 2, wherein the weakly solvating compound is at least one member selected from the group consisting of alkyl aryl ethers and diaryl ethers.

11. The method of claim 8, wherein the weakly solvating compound is at least one member selected from the group consisting of alkyl aryl ethers and diaryl ethers.

12. The method of claim 10, wherein the weakly solvating ether comprises anisole.

13. The method of claim 11, wherein the weakly solvating ether comprises anisole.

14. The method of claim 10, wherein the liquid hydrocarbon comprises benzene.

15. The method of claim 12, wherein the liquid hydrocarbon comprises benzene.

16. In a method of preparing a solvated lithium metal adduct of a member selected from the group consisting of conjugated polyene hydrocarbons and vinyl-substituted aromatic hydrocarbons wherein lithium metal is reacted with said conjugated polyene hydrocarbon monomer or vinyl-substituted aromatic hydrocarbon monomer in the presence of member selected from the group consisting of volatile inert liquid dialkyl ethers and cyclic ethers and a liquid hydrocarbon solvent, to produce said lithium metal adduct, and removing the unreacted lithium metal from the solution of said adduct, the improvement which comprises admixing said solution with a member selected from the group consisting of weakly solvating liquid ethers and weakly solvating liquid tertiary amines having boiling points substantially higher than the boiling point of said weakly solvating compounds, and evaporating from said mixture substantially all of said dialkyl ether or cyclic ether without substantial evaporation of said weakly solvating compound.

17. The method of claim 16, wherein the liquid hydrocarbon solvent has a boiling point such that the evaporation is also effective to remove a substantial part of the liquid hydrocarbon solvent to produce a solution of said adduct in a mixture containing said weakly solvating compound and liquid hydrocarbon solvent in a weight ratio of 5 to 50 of said weakly solvating compound to 95 to 50 of said liquid hydrocarbon solvent.

18. The method of claim 16, wherein the evaporation is effected by flash evaporation.

19. The method of claim 16, wherein the conjugated polyene hydrocarbon is at least one number selected from the group consisting of isoprene and 1,3-butadiene.

20. The method of claim 16, wherein the weakly solvating ether is at least one member selected from the group consisting of alkyl aryl ethers and diaryl ethers.

21. The method of claim 20, wherein the dialkyl and cyclic ethers are selected from the group consisting of dimethyl ether, diethyl ether and tetrahydrofuran, and wherein the weakly solvating ether comprises anisole.

22. The method of claim 21, wherein the liquid hydrocarbon is a member selected from the group consisting of benzene, toluene, n-heptane and n-hexane.

23. The method of claim 17, which includes the step of chain-extending the monomer by the addition thereto of a conjugated polyene hydrocarbon.

24. The method of claim 23, wherein said chain-extension is effected after the evaporation of said dialkyl ether or cyclic ether.

25. The method of claim 24, wherein said chain-extension is effected prior to the evaporation of said dialkyl ether or cyclic ether.

* * * * *